(12) United States Patent
Kwon et al.

(10) Patent No.: US 9,098,389 B2
(45) Date of Patent: Aug. 4, 2015

(54) MEMORY SYSTEM AND OPERATING METHOD THEREOF

(71) Applicant: SK hynix Inc., Icheon-si Gyeonggi-do (KR)

(72) Inventors: Yong Kee Kwon, Icheon-si (KR); Hyung Dong Lee, Icheon-si (KR); Young Suk Moon, Icheon-si (KR); Hyung Gyun Yang, Icheon-si (KR)

(73) Assignee: SK Hynix Inc., Gyeonggi-do (KR)

( * ) Notice: Subject to any disclaimer, the term of this patent is extended or adjusted under 35 U.S.C. 154(b) by 272 days.

(21) Appl. No.: 13/844,920

(22) Filed: Mar. 16, 2013

(65) Prior Publication Data

US 2014/0143508 A1    May 22, 2014

(30) Foreign Application Priority Data

Nov. 19, 2012  (KR) .................. 10-2012-0130863
Nov. 19, 2012  (KR) .................. 10-2012-0130864

(51) Int. Cl.
*G06F 13/16* (2006.01)
*G06F 12/00* (2006.01)
*G06F 3/06* (2006.01)

(52) U.S. Cl.
CPC .............. *G06F 12/00* (2013.01); *G06F 3/0613* (2013.01); *G06F 3/0635* (2013.01); *G06F 3/0683* (2013.01); *G06F 13/1626* (2013.01)

(58) Field of Classification Search
None
See application file for complete search history.

(56) References Cited

U.S. PATENT DOCUMENTS

| | | | |
|---|---|---|---|
| 6,028,725 A * | 2/2000 | Blumenau | 360/8 |
| 2007/0268765 A1* | 11/2007 | Woo et al. | 365/207 |
| 2009/0248994 A1* | 10/2009 | Zheng et al. | 711/151 |
| 2011/0296118 A1* | 12/2011 | Carter et al. | 711/154 |

FOREIGN PATENT DOCUMENTS

| | | |
|---|---|---|
| KR | 100632371 B1 | 9/2006 |
| KR | 1020100083219 A | 7/2010 |
| KR | 1020110048576 A | 5/2011 |

* cited by examiner

*Primary Examiner* — Aimee Li
*Assistant Examiner* — Jason Blust
(74) *Attorney, Agent, or Firm* — William Park & Associates Ltd.

(57) ABSTRACT

A memory system includes a memory device and a memory controller. The memory device includes a plurality of memory dies having different page sizes. The memory controller generates a plurality of chip selection signals for activating the plurality of memory dies based on the reordering number of requests received from a processor.

16 Claims, 7 Drawing Sheets

US 9,098,389 B2

MEMORY SYSTEM AND OPERATING METHOD THEREOF

CROSS-REFERENCES TO RELATED APPLICATION

The present application claims priority under 35 U.S.C. §119(a) to Korean application number 10-2012-0130863, filed on Nov. 19, 2012 and Korean application number 10-2012-0130864, filed on Nov. 19, 2012, in the Korean Intellectual Property Office, which are incorporated herein by reference in their entirety.

BACKGROUND

1. Technical Field

Various embodiments generally relate to a semiconductor memory, and more particularly, to a memory system including a is semiconductor memory and an operating method thereof.

2. Related Art

In order to increase the degree of integration of memory devices and a data processing capacity, a stack memory device in which a plurality of memory chips is stacked within a single package is being developed. Furthermore, in order to improve communication speed between a processor, such as a CPU or a GPU, and a memory device, a memory controller or an interface chip is being used. Furthermore, a semiconductor device using a system-in package method of packaging a memory device and a memory controller or an interface chip together is being developed.

Meanwhile, a memory device includes memory banks each including a plurality of memory cells. The memory cells of a memory bank can be accessed through a word line and a bit line. In general, the memory device has a unit called a page. In the memory device, the page can be defined as the number of memory cells that can be accessed by a single active operation. In general, the page may be considered as the number of bit lines coupled with one word line because only one word line can be activated by a single active operation in the memory bank of the memory device.

A memory device, particularly, DRAM has a fixed page size. The meaning that DRAM has a fixed page size means that the time when a word line is accessed and the time when a word line is precharged are fixed. Accordingly, to access a page having a fixed size irrespective of the characteristics of data, such as the locality of is the data and the size of the data, leads to an unnecessary loss.

SUMMARY

A memory system capable of selectively accessing memory chips having different page sizes depending on the characteristics of data is described herein. Furthermore, a memory system capable of selectively accessing memory banks having different page sizes depending on the characteristics of data is described herein.

In an embodiment of the present invention, a memory system includes a memory device configured to include a plurality of memory dies having different page sizes and a memory controller configured to generate a plurality of chip selection signals for activating the plurality of memory dies based on a reordering number of requests received from a processor.

In accordance with an embodiment of the present invention, a memory system includes a memory device configured to include a plurality of memory dies having different page sizes and a memory controller configured to access one of the plurality of memory dies based on the reordering number of requests received from a processor.

In an embodiment of the present invention, an operating method of a memory system including a memory device configured to including a plurality of memory dies having different page sizes and a memory controller configured to control the memory device includes by the memory controller, receiving a plurality of requests from a is processor and reordering the requests, comparing, by the memory controller, a reordering number of the requests with a threshold, and activating, by the memory controller, one of the plurality of memory dies based on a result of the comparison.

In an embodiment of the present invention, a memory system includes a memory controller configured to generate page control signals based on the reordering number of requests received from a processor and a memory device configured to include a plurality of memory banks having different page sizes and activate one of the plurality of memory banks in response to the page control signals.

BRIEF DESCRIPTION OF THE DRAWINGS

Features, aspects, and embodiments are described in conjunction with the attached drawings, in which.

DETAILED DESCRIPTION

Hereinafter, a memory system and an operating method thereof according to the present invention will be described below with reference to the accompanying drawings through various embodiments.

Figure 1:
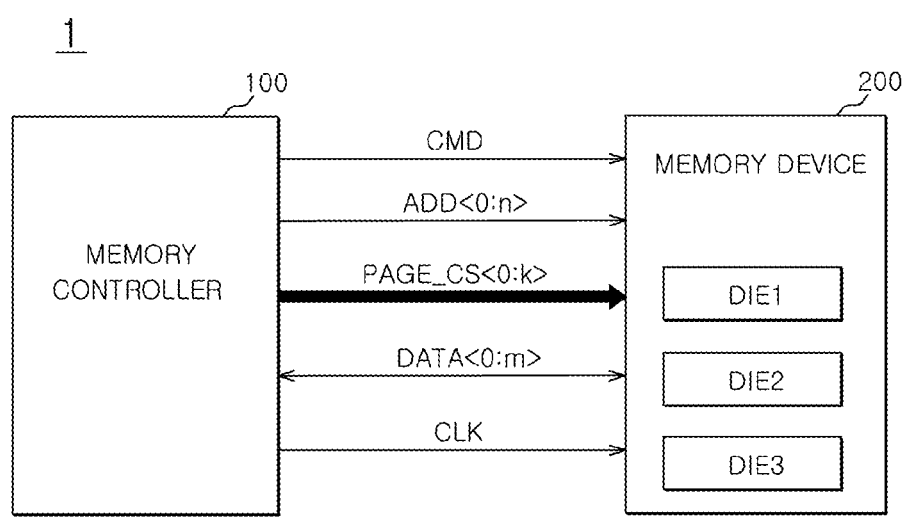
FIG. 1 is a diagram showing a construction of a memory system in accordance with an embodiment of the present invention.

FIG. 1 is a diagram showing a construction of a memory system 1 in accordance with an embodiment of the present invention. As shown in FIG. 1, the memory system 1 may include a memory controller 100 and a memory device 200. The memory device 200 may include a volatile memory device, such as DRAM, but the memory device 200 is not limited thereto. The memory controller 100 relays communication between a processor (not shown) and the memory device 200. That is, the memory controller 100 controls the memory device 200 in response to a variety of signals and data received from the processor and provides data and signals, outputted is from the memory device 200, to the processor.

In an embodiment of the present invention, the memory device 200 can be a stack memory device in which a plurality of memory dies is stacked. The memory device is illustrated as including 3 stacked memory dies in FIG. 1, but the number of stacked memory dies is not limited thereto. The first to third memory dies DIE1, DIE2, and DIE3 of the memory device 200 have different page sizes. For example, the first memory die DIE1 can have the largest page size, the third memory die DIE3 can have the smallest page size, and the second memory die DIE2 can have a page size smaller than the first memory die DIE1 and greater than the third memory die DIE3. For example, if the second memory die DIE2 has a page size of t, the first memory die DIE1 can have a page size of 2t and the third memory die DIE3 can have a page size of t/2.

In the case of a memory device, such as DRAM, a page can commonly mean the number of memory cells that can be accessed by a single active operation. That is, a memory device, such as DRAM, may include a memory cell array electrically connected to word lines and bit lines. A page can mean the number of bit lines or columns coupled with a word line. Accordingly, the first memory die DIE1 may include a larger number of memory cells accessible by a single active operation than each of the second and the third memory dies DIE2 and DIE3, and the third memory die DIE3 may include the smallest number of memory cells accessible by a single active operation. In various embodiments, the word lines of the first memory die DIE1 can be coupled with the number of bit lines or columns greater than those of each of the second and the third memory dies DIE2 and DIE3, and the word lines of the third memory die DIE3 can be coupled with the smallest number of memory cells.

The memory controller 100 receives a request, read data, and write data from the processor and generates a command signal CMD, address signals ADD<0:n>, data DATA<0:m>, and a clock signal CLK for controlling the memory device 200. Furthermore, if a stack memory device, such as the memory device 200, is controlled, the memory controller 100 generates chip selection signals PAGE_CS<0:k> for accessing any one of the plurality of stacked memory dies. Any one of the plurality of memory dies DIE1, DIE2, and DIE3 can be activated in response to the chip selection signals PAGE_CS<0:k>, and the activated memory die can perform a data read or write operation in response to the command signal CMD, the address signals ADD<0:n>, the data DATA<0:m>, and the clock signal CLK. The number of chip selection signals PAGE_CS<0:k> generated can correspond to the number of stacked memory dies. In an embodiment of the present invention, three chip selection signals PAGE_CS<0:2> are illustrated as being generated in response to the first to the third memory dies DIE1, DIE2, and DIE3 having different page sizes.

In an embodiment of the present invention, the memory controller 100 generates a plurality of the chip selection signals PAGE_CS<0:k> based on the reordering number of the requests is received from the processor. For example, the memory controller 100 can access a memory die having a larger page size as the reordering number of the requests becomes greater and can access a memory die having a smaller page size as the reordering number of the requests becomes smaller. That is, when the reordering number of the requests is many, the memory controller 100 can generate the first chip selection signal PAGE_CS<0> so that the first memory die DIE1 having the largest page size is activated. When the reordering number of the requests is small, the memory controller 100 can generate the third chip selection signal PAGE_CS<2> so that the third memory die DIE3 having the smallest page size is activated.

Figure 2:
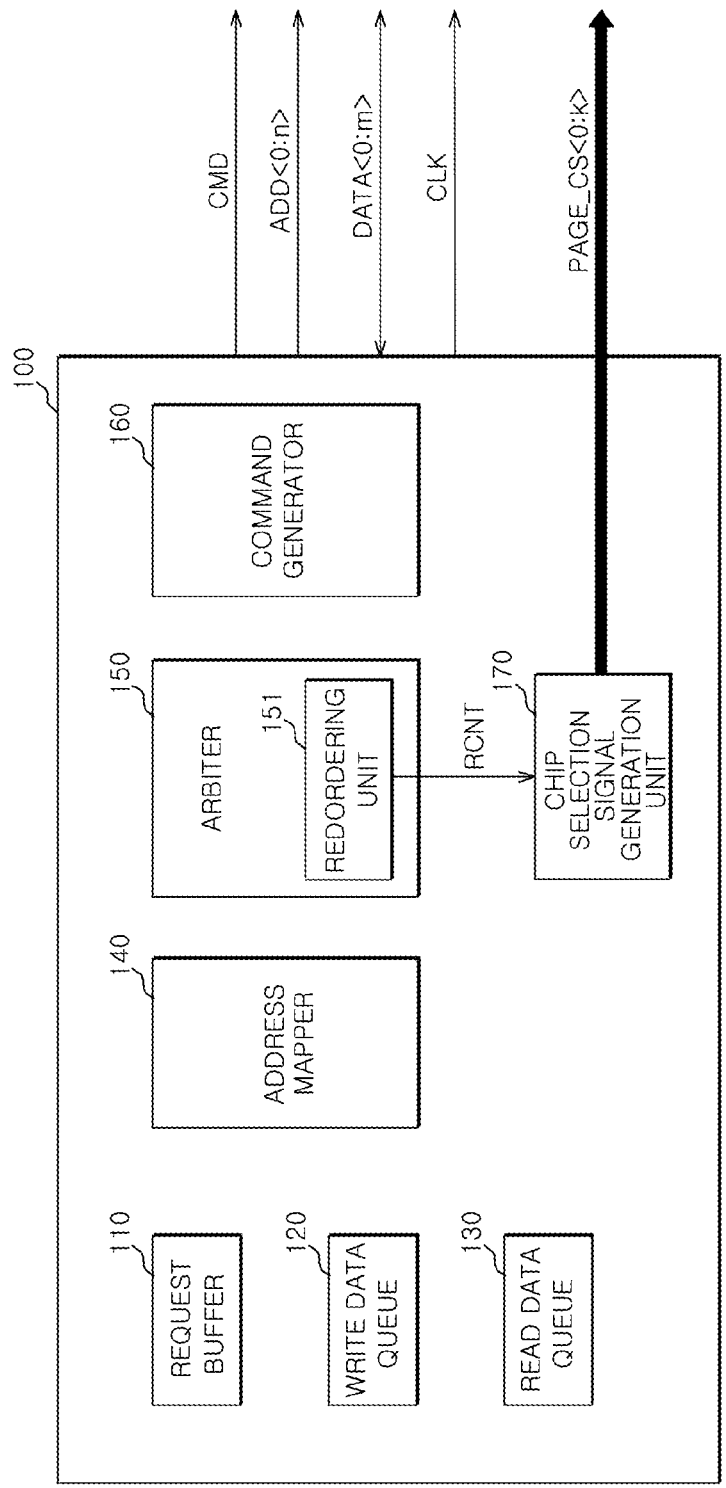
FIG. 2 is a schematic block diagram showing an embodiment of the construction of a memory controller of FIG. 1.

FIG. 2 is a schematic block diagram showing an embodiment of the construction of the memory controller 100 of FIG. 1. Wherever possible, the same reference numbers will be used throughout the drawings to refer to the same or like parts. As shown in FIG. 2, the memory controller 100 can include a request buffer 110, a write data queue 120, a read data queue 130, an address mapper 140, an arbiter 150, a command generator 160, and a chip selection signal generation unit 170. The request buffer 110, the write data queue 120, and the read data queue 130 store and buffer request and data received from the processor. The request can include a write request, a read request, and address information for instructing the memory device 200 to operate. The address mapper 140 generates the address signals ADD<0:n> transmitted from the output of the request buffer 110 to the memory device 200. The is command generator 160 generates a variety of the command signals CMD to be inputted to the memory device 200 in response to the request.

The arbiter 150 plays a key role of relaying communication between the processor and the memory device 200. The arbiter 150 may include a reordering unit 151 for sequentially receiving a plurality of requests from the processor and efficiently reordering the requests. The reordering unit 151 sequentially receives a plurality of requests from the processor and reorders the requests. The reordering of the requests is for improving the operation efficiency of the memory device 200. The reordering enables a later received request that can be immediately executed to be first executed if a first received request is difficult to be immediately executed. That is, if an inevitable time delay occurs when requests are sequentially executed, the reordering unit 151 does not sequentially execute the received requests, but realigns order of the requests so that the reordered requests can be sequentially executed. This request reordering operation can efficiently improve the performance of a stack memory device including a plurality of dies or a multi-rank memory device including a plurality of ranks.

When the reordering number of the requests is many, it is determined that a page hit rate is high and the locality of the pages is good. In contrast, when the reordering number of the requests is small, the requests are determined as random requests having a low page hit rate. When the locality of pages is good, a larger number of is memory cells that can be accessed at once are advantageous. In general, a lot of time is consumed in order to activate and precharge one word line. Accordingly, if requests related to a column accessible through a specific word line are collected and executed at once when the specific word line is activated, operating speed of the memory device 200 can be improved. For this operation improvement, the reordering unit 151 of the memory controller 100 realigns requests received from the processor. Accordingly, when the reordering number of the requests is many, a larger number of bit lines or columns coupled with one word line are advantageous. That is, when the reordering number of the requests is many, an increase in the size of a page is advantageous. In contrast, when the reordering number of the requests is small, a smaller number of bit lines or columns coupled with one word line is advantageous because the repetition of an operation for activating and deactivating a page having a large size is inefficient. That is, when the reordering number of the requests is small, a decrease in the size of a page is advantageous. Accordingly, the memory controller 100 can select a memory die having a large page size when the page hit rate is high and can select a memory die having a small page size when the page hit rate is low.

Referring to FIG. 2, the memory controller 100 may include the chip selection signal generation unit 170. The chip selection signal generation unit 170 is electrically connected to the reordering unit 151. The chip selection signal generation unit 170 generates the plurality of chip selection signals PAGE_CS<0:k> in response to information RCNT on the reordering number of the requests generated from the reordering unit 151. The chip selection signal generation unit 170 can compare the reordering number with a threshold and generate the plurality of chip selection signals PAGE_CS<0:k> based on a result of the comparison. For example, when the reordering number is many, the chip selection signal generation unit 170 can enable the first chip selection signal PAGE_CS<0> so that the first memory die DIE1 having a large page size is accessed. When the reordering number is small, the chip selection signal generation unit 170 can enable the third chip selection signal PAGE_CS<2> so that the third memory die DIE3 having a small page size is accessed.

Figure 3:
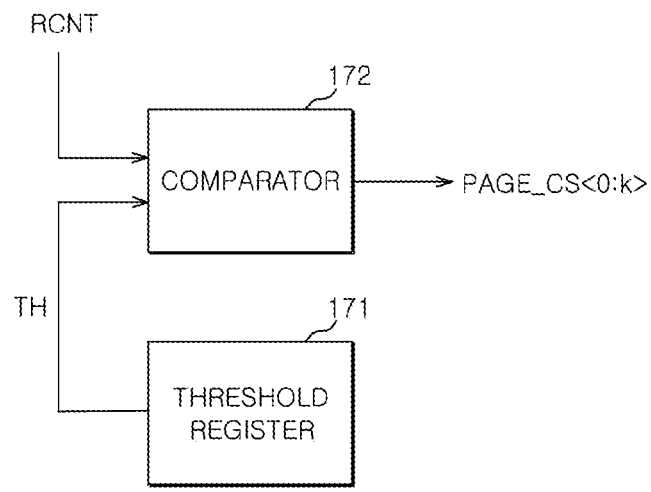
FIG. 3 is a schematic block diagram showing an embodiment of the construction of a chip selection signal generation unit of FIG. 2.

FIG. 3 is a schematic block diagram showing an embodiment of the construction of the chip selection signal generation unit 170 of FIG. 2. As shown in FIG. 3, the chip selection signal generation unit 170 may include a threshold register 171 and a comparator 172. The threshold register 171 stores a threshold TH. The threshold TH may include information on a reordering number that may become a criterion for efficiently selecting a page size.

The comparator 172 receives the information RCNT on the reordering number of the requests from the reordering unit 161. Furthermore, the comparator 172 receives information on the threshold TH from the threshold register 171. The comparator 172 compares the information RCNT with the threshold TH and generates the chip selection signals PAGE_CS<0:k> based on a result of the comparison. The information RCNT on the reordering number of the requests can be generated by counting the number of times that the requests are reordered.

If, as a result of the comparison, the information RCNT exceeds the threshold TH, the comparator 172 can enable the first chip selection signal PAGE_CS<0> on which the first memory die DIE1 is selected. If the information RCNT does not exceed the threshold TH, the comparator 172 can enable the second chip selection signal PAGE_CS<1> or the third chip selection signal PAGE_CS<2> on which the second memory die DIE2 or the third memory die DIE3 is selected.

Figure 4:
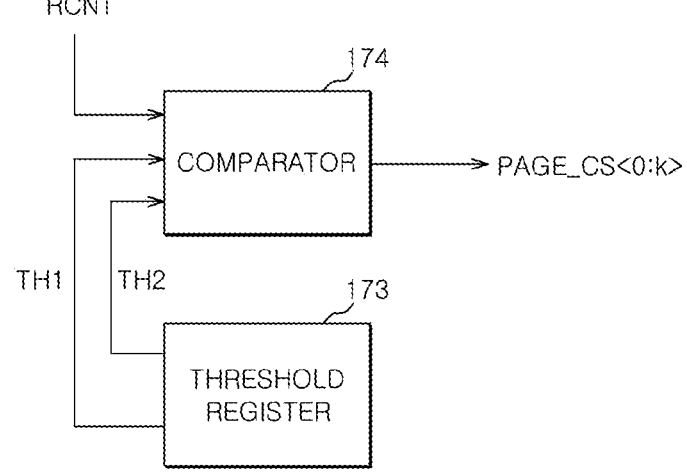
FIG. 4 is a schematic block diagram showing an embodiment of the construction of the chip selection signal generation unit of FIG. 2.

FIG. 4 is a schematic block diagram showing an embodiment of the construction of the chip selection signal generation unit 170 of FIG. 2. Referring to FIG. 4, a threshold register 173 can store a plurality of thresholds TH (i.e., TH1, TH2, etc.). The threshold register 173 provides the first and second thresholds TH1 and TH2 to a comparator 174. The first threshold TH1 can have a value higher than the second threshold TH2.

The comparator 174 can compare the information RCNT with each of the first and the second thresholds TH1 and TH2 and generate the chip selection signals PAGE_CS<0:k> based on a result of the comparison. If, as a result of the comparison, the information RCNT exceeds the first threshold TH1, the comparator 174 can enable the first chip selection signal PAGE_CS<0> so that the first memory is die DIE1 having the largest page size is selected. Furthermore, if, as a result of the comparison, the information RCNT is between the first and the second thresholds TH1 and TH2, the comparator 174 can enable the second chip selection signal PAGE_CS<1> so that the second memory die DIE2 having a middle page size is selected. Furthermore, if, as a result of the comparison, the information RCNT does not exceed the second threshold TH2, the comparator 174 can enable the third chip selection signal PAGE_CS<2> so that the third memory die DIE3 having the smallest page size is selected.

Figure 5:
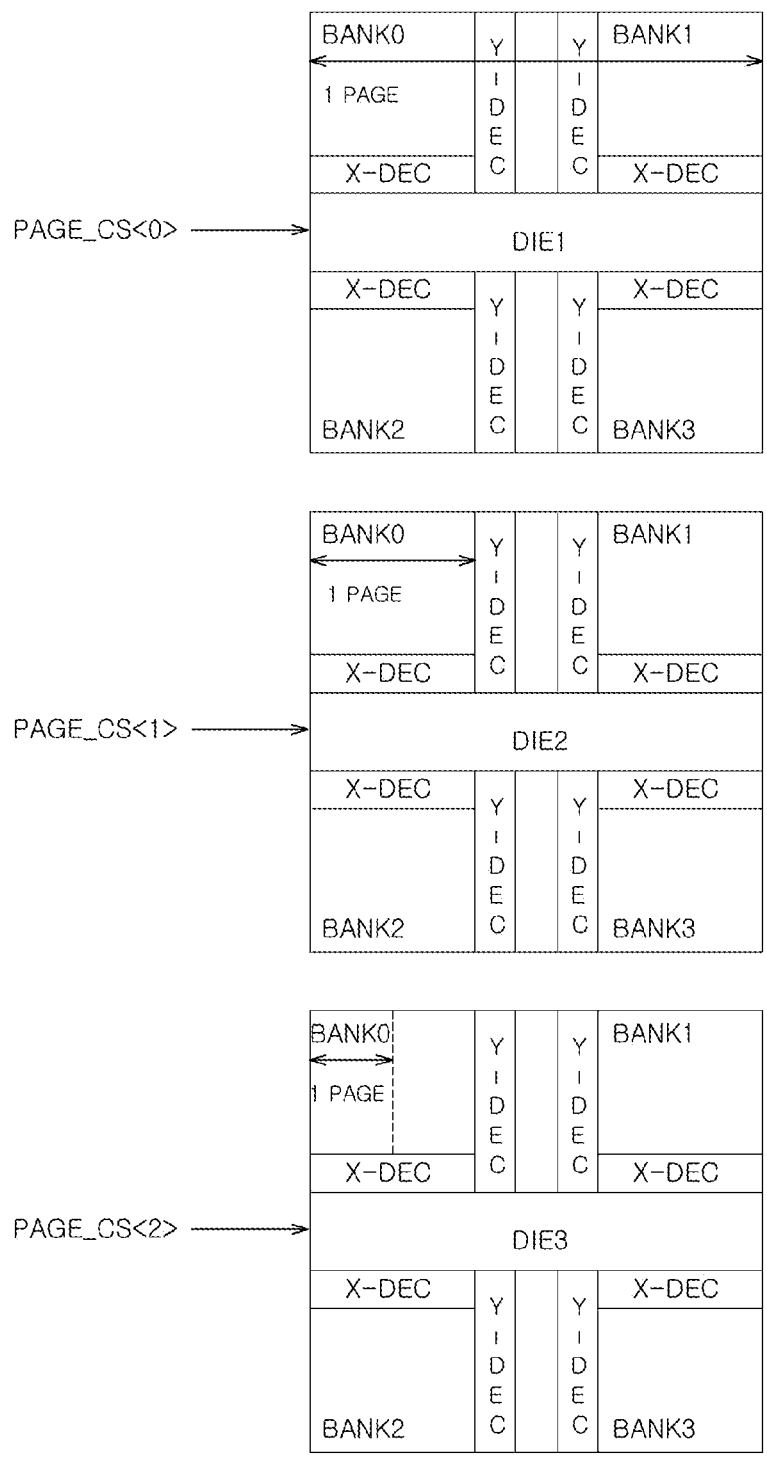
FIG. 5 is a schematic diagram showing an embodiment of the construction of first to third memory dies of FIG. 1.

FIG. 5 is a schematic diagram showing an embodiment of the construction of the first to the third memory dies DIE1, DIE2, and DIE3 of the memory device 200 of FIG. 1. Wherever possible, the same reference numbers will be used throughout the drawings to refer to the same or like parts. Each of the first to the third memory dies DIE1, DIE2, and DIE3 can include four memory banks BANK0, BANK1, BANK2, and BANK3 and may include a row decoder X-DEC and a column decoder Y-DEC for accessing the memory cells of each of the memory banks BANK0, BANK1, BANK2, and BANK3.

The first memory die DIE1 has a page size having a length crossing two memory banks. The second memory die DIE2 has a page size having a length crossing one memory bank. The third memory die DIE3 has a page size having a length crossing half of one memory bank. The row decoders X-DEC and the column decoders Y-DEC of the first to the third memory dies DIE1, DIE2, and DIE3 can be preset so that they operate according to a corresponding page size.

An operating method of the memory system 1 in accordance with an embodiment of the present invention is described below with reference to FIGS. 1 to 5. The memory controller 100 relays communication between the processor and the memory device 200. The memory controller 100 generates the command signal CMD, etc. in response to a request received from the processor so that the memory device 200 can perform a read or write operation.

The memory controller 100 sequentially receives a plurality of requests from the processor and reorders the plurality of requests in order to efficiently control the memory device 200. The comparator 172 or 174 of the chip selection signal generation unit 170 counts the number of times that the requests are reordered, compares the information RCNT on the reordering number of the requests with the threshold TH, and generates the chip selection signals PAGE_CS<0:k> based on a result of the comparison. If, as a result of the comparison, the information RCNT exceeds the threshold TH, the chip selection signal generation unit 170 enables the first chip selection signal PAGE_CS<0> in order to select the first memory die DIE1 having a large page size. The first memory die DIE1 performs a read or write operation in response to the command signal CMD, etc. generated in response to the reordered requests.

In contrast, if, as a result of the comparison, the information RCNT does not exceed the threshold TH, the chip selection signal generation unit 170 enables the second chip selection signal PAGE_CS<1> or the third chip selection signal PAGE_CS<2> in is order to select the second memory die DIE2 or the third memory die DIE3 having a small page size.

Figure 6:
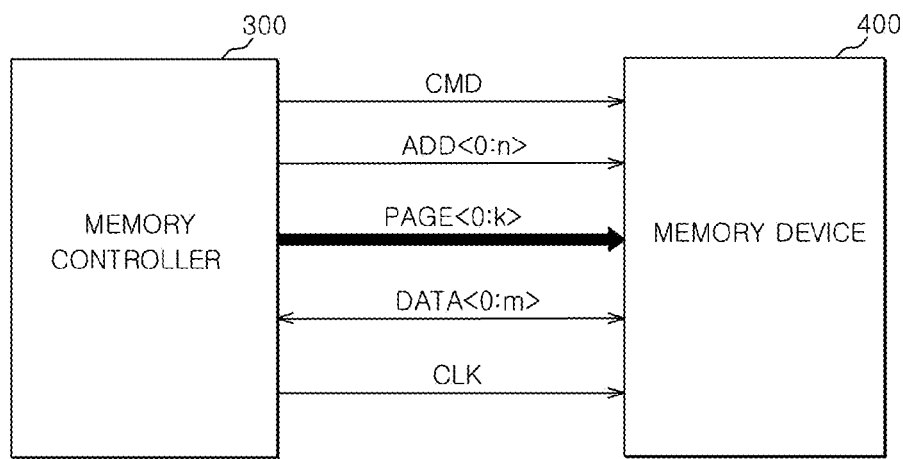
FIG. 6 is a diagram showing a construction of a memory system in accordance with an embodiment of the present invention.

FIG. 6 is a diagram showing a construction of a memory system 2 in accordance with an embodiment of the present invention. The memory system 2 may include a memory controller 300 and a memory device 400. The memory controller 300 is substantially the same as the memory controller 100 of the memory system of FIG. 1 except that the memory controller 100 generates the chip selection signals PAGE_CS<0:k> in order to select a plurality of dies having different page sizes and the memory controller 300 generates page control signals PAGE<0:k> in order to select memory banks having different page sizes. Here, a method of generating the page control signals PAGE<0:k> can be the same as a method of generating the chip selection signals PAGE_CS<0:k>.

Referring to FIG. 6, the memory device 400 can include a plurality of memory banks having different page sizes. The plurality of memory banks is described in more detail below. The memory device 400 can activate one of the plurality of memory banks in response to the page control signals PAGE<0:k>. The memory device 400 can activate a memory bank having a large page size, from among the plurality of memory banks, according to a large reordering number of the requests and can activate a memory bank having a small page size, from among the plurality of memory banks, according to a small reordering number of the requests.

Figure 7:
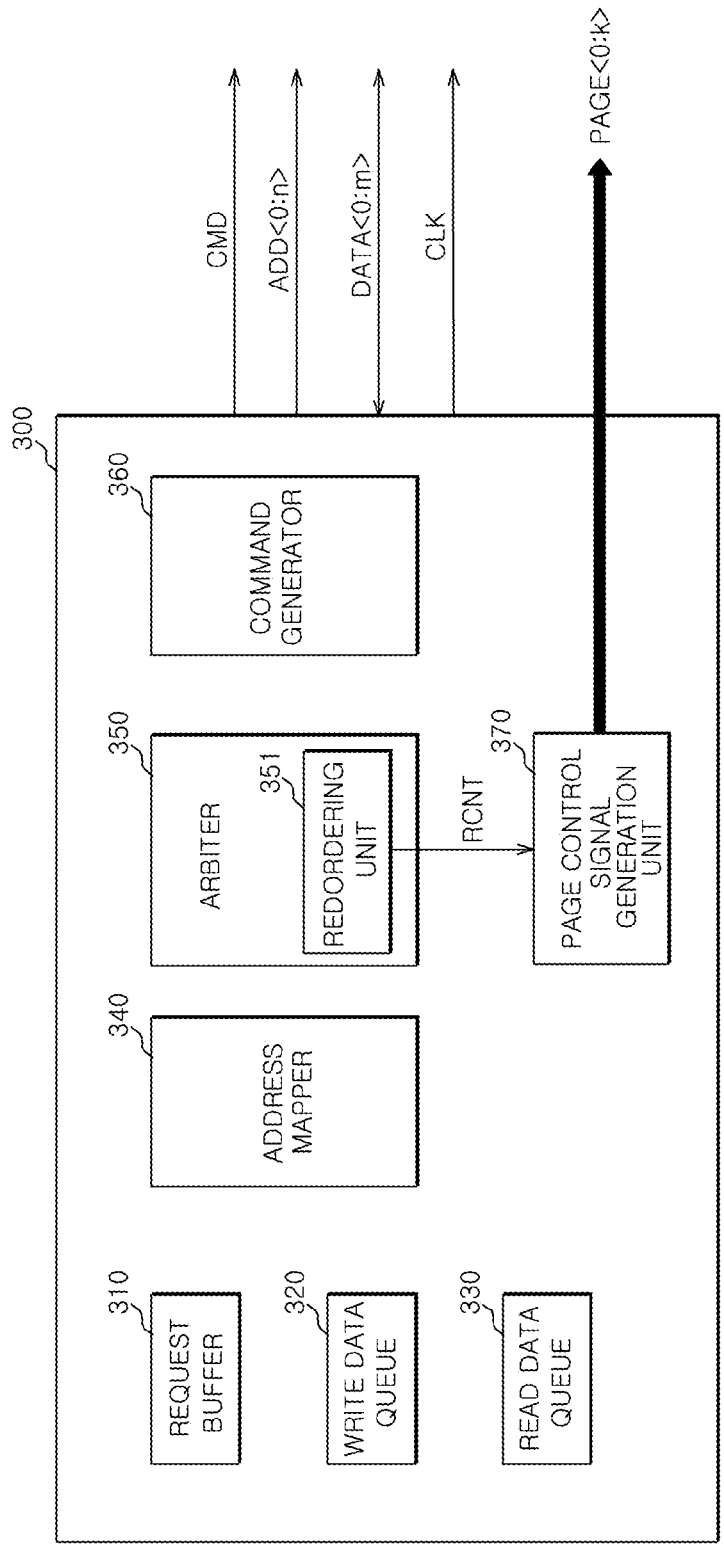
FIG. 7 is a schematic block diagram showing an embodiment of the construction of a memory controller of FIG. 6.

FIG. 7 is a schematic block diagram showing an embodiment of the construction of the memory controller 300 of FIG. 6. Referring to FIG. 7, the memory controller 300 is substantially the same as the memory controller 100 of FIG. 2 except that the memory controller 100 of FIG. 2 may include the chip selection signal generation unit 170 for generating the chip selection signals PAGE_CS<0:k> in order to select a plurality of dies having different page sizes and the memory controller 300 of FIG. 7 may include a page control signal generation unit 370 (i.e., page control signal generation unit) for generating the page control signals PAGE<0:k> in order to select a plurality of memory banks having different page sizes. The chip selection signal generation unit 170 and the page control signal generation unit 370 have only different names, but can have substantially the same construction and perform the same operation. The memory controller 300 may include a request buffer 310, a write data queue 320, a read data queue 330, an address mapper 340, an arbiter 350 which includes a reordering unit 351 and a command generator 360. The configurations 310, 320, 330,340, 350, 351 and 360 of the memory controller 300 are substantially same with the configurations 110, 120, 130, 140, 150, 151 and 160 of the memory controller 100 in FIG. 2.

Figure 8:
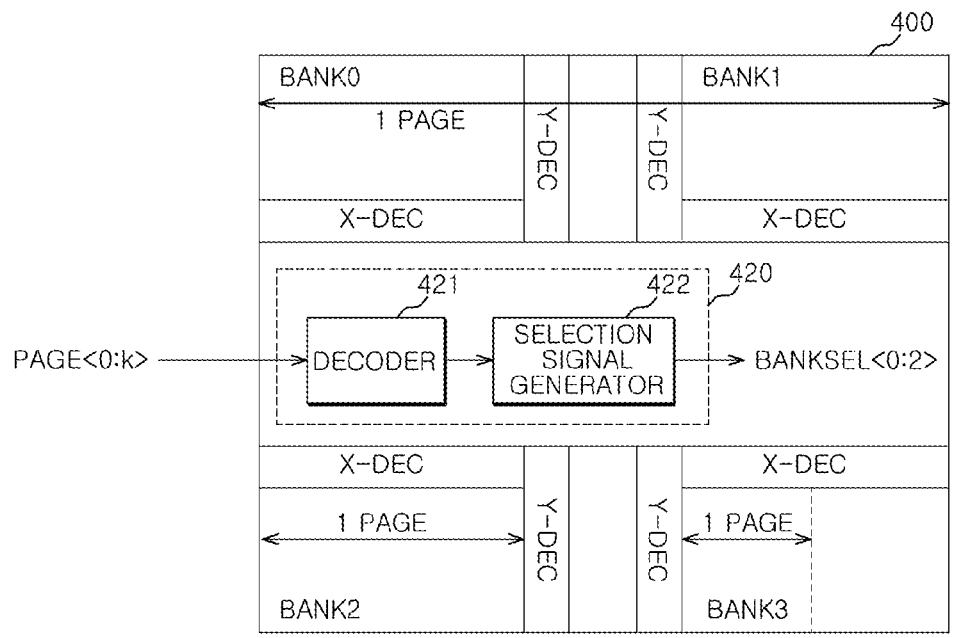
FIG. 8 is a schematic diagram showing an embodiment of the construction of a memory device of FIG. 1.

FIG. 8 is a schematic diagram showing an embodiment of the construction of the memory device 400 of FIG. 6. As shown in FIG. 8, the memory device 400 may include a plurality of memory banks having different page sizes. The memory device 400 may include a memory bank having a preset page size. The memory device 400 can include, for example, a first memory bank BANK0, BANK1 having the largest page size, a second memory bank BANK2 having a middle page size, and a third memory bank BANK3 having the smallest page size. Here, the size of the page and the number of memory banks are not limited.

The memory device 400 further may include a bank selector 420. The bank selector 420 generates bank selection signals BANKSEL<0:2> for activating one of the plurality of memory banks in response to the page control signals PAGE<0:k>. The bank selection signals BANKSEL<0:2> can be provided to the respective row decoders X-DEC of the memory banks BANK0, BANK1, BANK2, and BANK3.

The bank selector 420 may include a decoder 421 and a selection signal generator 422. The decoder 421 receives the page control signals PAGE<0:k> from the memory controller 300 and decodes the page control signals PAGE<0:k>. The selection signal generator 422 generates the bank selection signals BANKSEL<0:2> in response to the output of the decoder 421. The number of bank selection signals BANK-SEL<0:2> is illustrated as being 3 in FIG. 5.

When the first bank selection signal BANKSEL<0> is generated in response to the page control signals PAGE<0:k>, the memory device 400 activates the first memory bank BANK0, BANK1 having the largest page size. Here, the first memory bank can include both the bank No. 0 BANK0 and the bank No. 1 BANK1. In an embodiment of the present invention, the bank No. 0 BANK0 and the bank No. 1 BANK1 are physically separated from each other, but can be logically combined. That is, the first memory bank has a page size having a length crossing two physical memory banks. In an embodiment of the present invention, the memory device 400 has been illustrated as having physically the same size in order to describe that the memory device 400 can be implemented using a is common memory device, but the present invention is not limited thereto. The memory device 400 may include memory banks having physically different sizes.

When the second bank selection signal BANKSEL<1> is generated in response to the page control signals PAGE<0:k>, the memory device 400 activates the second memory bank BANK2 having a middle page size. The second memory bank BANK2 has a page size having a length crossing one physical memory bank. Furthermore, when the third bank selection signal BANKSEL<2> is generated in response to the page control signals PAGE<0:k>, the memory device 400 activates the third memory bank BANK3 having the smallest page size. The third memory bank BANK3 has a page size having a length crossing half of one physical memory bank.

While various embodiments have been described above, it will be understood to those skilled in the art that the embodiments described are by way of example only. Accordingly, the memory system and the operating method thereof described herein should not be limited based on the described embodiments. Rather, the memory system described herein should only be limited in light of the claims that follow when taken in conjunction with the above description and accompanying drawings.

What is claimed is:

1. A memory system, comprising:
a memory device configured to comprise a plurality of memory dies having different page sizes; and
a memory controller configured to generate a plurality of chip selection signals for activating the plurality of memory dies based on a reordering number of requests received from a processor,
wherein the memory controller activates a memory die having a larger page size, from among the plurality of memory dies, as the reordering number is greater than a threshold and activates a memory die having a smaller page size, from among the plurality of memory dies, as the reordering number is smaller than the threshold.

2. The memory system according to claim 1, wherein the memory controller comprises:
a reordering unit configured to sequentially receive a plurality of requests from the processor and realign order of the plurality of requests; and
a chip selection signal generation unit configured to compare information on a reordering number of the requests, received from the reordering unit, with a threshold and generate the plurality of chip selection signals based on a result of the comparison.

3. The memory system according to claim 2, wherein the chip selection signal generation unit comprises:
a threshold register configured to store the threshold; and
a comparator configured to compare the information on the reordering number with the threshold and enable one of the plurality of chip selection signals based on a result of the comparison.

4. A memory system, comprising:
a memory device configured to comprise a plurality of memory dies having different page sizes; and
a memory controller configured to access one of the plurality of memory dies based on a reordering number of requests received from a processor,
wherein the memory controller accesses a memory die having a larger page size, from among the plurality of memory dies, as the reordering number is greater than a threshold and accesses a memory die having a smaller page size, from among the plurality of memory dies, as the reordering number is smaller than the threshold.

5. The memory system according to claim 4, wherein the memory controller comprises:
a reordering unit configured to sequentially receive a plurality of requests from the processor and realign order of the plurality of requests; and
a chip selection signal generation unit configured to compare information on a reordering number of the requests with each of a plurality of thresholds and generate a plurality of chip selection signals for accessing one of the plurality of memory dies based on a result of the comparison.

6. The memory system according to claim 5, wherein the chip selection signal generation unit comprises:
a threshold register configured to store the plurality of thresholds; and
a comparator configured to compare the information on the reordering number with each of the plurality of thresholds and enable one of the plurality of chip selection signals based on a result of the comparison.

7. An operating method of a memory system comprising a memory device configured to comprise a plurality of memory dies having different page sizes and a memory controller configured to control the memory device, the operating method comprising:
by the memory controller, receiving a plurality of requests from a processor and realigning the requests;
comparing, by the memory controller, a reordering number of the requests with a threshold; and
activating, by the memory controller, one of the plurality of memory dies based on a result of the comparison,
wherein the activating, by the memory controller, one of the plurality of memory dies comprises activating a memory die having a large page size through a chip selection signal, from among the plurality of memory dies, when the reordering number exceeds the threshold and activating a memory die having a small page size through a chip selection signal, from among the plurality of memory dies, when the reordering number is the threshold or lower.

8. The operating method according to claim 7, wherein the comparing, by the memory controller, of the reordering number of the requests with the threshold comprises:
counting the reordering number of the requests; and
comparing a result of the counting with a preset threshold.

9. The operating method according to claim 7, wherein the activating, by the memory controller, one of the plurality of memory dies comprises activating a memory die having a large page size through a chip selection signal, from among the plurality of memory dies, when the reordering number exceeds the threshold and activating a memory die having a small page size through a chip selection signal, from among the plurality of memory dies, when the reordering number is the threshold or lower.

10. The operating method according to claim 7, wherein the activating, by the memory controller, one of the plurality of memory dies comprises activating a memory die having a large page size through a page control signal, from among the plurality of memory dies, when the reordering number exceeds the threshold and activating a memory die having a small page size through a page control signal, from among the plurality of memory dies, when the reordering number is the threshold or lower.

11. A memory system, comprising:
a memory controller configured to generate page control signals based on a reordering number of requests received from a processor; and
a memory device configured to comprise a plurality of memory banks having different page sizes and activate one of the plurality of memory banks in response to the page control signals,
wherein the memory device activates a memory bank having a larger page size, from among the plurality of memory banks, as the reordering number is greater than a threshold and activates a memory bank having a smaller page size, from among the plurality of memory banks, as the reordering number is smaller than the threshold, in response to the page control signals.

12. The memory system according to claim 11, wherein the memory controller comprises:
a reordering unit configured to sequentially receive a plurality of requests from the processor and realign order of the plurality of requests; and
a page control signal generation unit configured to compare information on a reordering number of the requests, received from the reordering unit, with a threshold and generate the page control signals based on a result of the comparison.

13. The memory system according to claim 12, wherein the page control signal generation unit comprises:
a threshold register configured to store the threshold; and
a comparator configured to compare the information on the reordering number with the threshold and generate the page control signals based on a result of the comparison.

14. The memory system according to claim 11, wherein the memory device comprises a bank selector configured to generate bank selection signals in order to activate one of the plurality of memory banks in response to the page control signals.

15. The memory system according to claim 14, wherein the bank selector comprises:
a decoder configured to decode the page control signals; and
a selection signal generator configured to generate the bank selection signals in response to an output of the decoder and supply the generated bank selection signals to respective row decoders of the plural of memory banks.

16. The memory system according to claim 11, wherein the memory banks have physically different sizes.

* * * * *